(12) United States Patent
Agrawal et al.

(10) Patent No.: US 6,414,457 B1
(45) Date of Patent: Jul. 2, 2002

(54) AUTONOMOUS ROLLING ROBOT

(75) Inventors: Sunil K. Agrawal, Newark, DE (US); Shourov Bhattacharya, Wollstone Craft (AU)

(73) Assignee: The University of Delaware, Newark, DE (US)

( * ) Notice: Subject to any disclaimer, the term of this patent is extended or adjusted under 35 U.S.C. 154(b) by 0 days.

(21) Appl. No.: 09/640,027

(22) Filed: Aug. 16, 2000

Related U.S. Application Data

(60) Provisional application No. 60/149,611, filed on Aug. 16, 1999.

(51) Int. Cl.[7] .................................................. B25J 5/00
(52) U.S. Cl. ................... 318/568.12; 180/21; 180/6.48; 901/1
(58) Field of Search .................. 318/587, 560–696, 318/139; 446/437, 456, 439, 409, 460, 458, 443; 180/21, 22, 6.2, 6.48; 901/1, 44; D21/204, 205

(56) References Cited

U.S. PATENT DOCUMENTS

| | | | | |
|---|---|---|---|---|
| 4,471,567 A | * | 9/1984 | Martin | |
| 4,541,814 A | * | 9/1985 | Martin | |
| 5,439,408 A | * | 8/1995 | Wilkinson | |
| 5,533,921 A | * | 7/1996 | Wilkinson | |
| D375,986 S | * | 11/1996 | Wilkinson et al. | |
| 5,857,534 A | * | 1/1999 | DeVault et al. | |
| 5,871,386 A | * | 2/1999 | Bart et al. | |
| 6,066,026 A | * | 5/2000 | Bart et al. | |

FOREIGN PATENT DOCUMENTS

| | | | |
|---|---|---|---|
| JP | 7-285475 | * | 10/1995 |
| WO | WO 97/01381 | * | 1/1997 |

* cited by examiner

*Primary Examiner*—Jeffrey Donels
(74) *Attorney, Agent, or Firm*—Connolly, Bove Lodge & Hutz, LLP

(57) ABSTRACT

An autonomous rolling robot is in the form of a hollow sphere containing at least two sets of rotors. Each set of rotors includes a rotor mounted on a shaft which is driven by a motor. All of the shafts are radially mounted within the hollow sphere so that an extension of the shafts would intersect at the geometric center of the sphere. The center of mass of the robot is also located at the geometric center of the sphere.

17 Claims, 1 Drawing Sheet

AUTONOMOUS ROLLING ROBOT

CROSS-REFERENCE TO RELATED APPLICATION

This application is based upon provisional application Serial No. 60/149,611, filed Aug. 16, 1999.

GOVERNMENT LICENSE RIGHTS

The U.S. Government has a paid up license in this invention and the right in limited circumstances to require the patent owner to license others on reasonable terms as provided by the terms of CMS 9696172 by the National Science Foundation.

BACKGROUND OF THE INVENTION

In recent years study of non-holonomic systems has been an area of active research. Non-holonomic systems are characterized by non-integratable rate constraints resulting from rolling contact or momentum conservation. Many applications fall into this category including wheeled robots, spacecrafts and underwater vehicles and some elegant solutions to motion planning have been presented using tools for differential geometry. Common non-holonomic systems are car-like or train-like robots. Mobile robots of a spherical shape have also been described.

It would be desirable to provide an effective robot which could be used for various applications such as mine clearance, surveillance and toys.

SUMMARY OF THE INVENTION

An object of this invention is to provide an autonomous rolling robot which would be effective in operation.

A further object of this invention is to provide such an autonomous rolling robot which could readily be controlled in its movement for various applications.

In accordance with this invention the autonomous rolling robot is in the form of a hollow sphere containing at least two rotors mounted on radially directed shafts. The rotors are driven by a drive mechanism contained within the sphere, preferably a remote operated motor. Thus, control is achieved through a remote transmitter. The rotors and the various structure within the sphere are located so that the center of mass lies exactly at the geometrical center of the spherical ball. The result is that the center of mass of the robot always lies above its contact point. Thus, the ball does not tend to tip over.

In a preferred practice of the invention two sets of rotors with a pair of rotors in each set are mounted inside the sphere. The rotors of each set are driven by a common motor. The rotors are equally spaced around the interior of the sphere so as to provide a balanced arrangement. A transmitter having two controls or actuators is able to send pulse data to each motor and thereby control the movement of the sphere.

DETAILED DESCRIPTION

Figure 1:
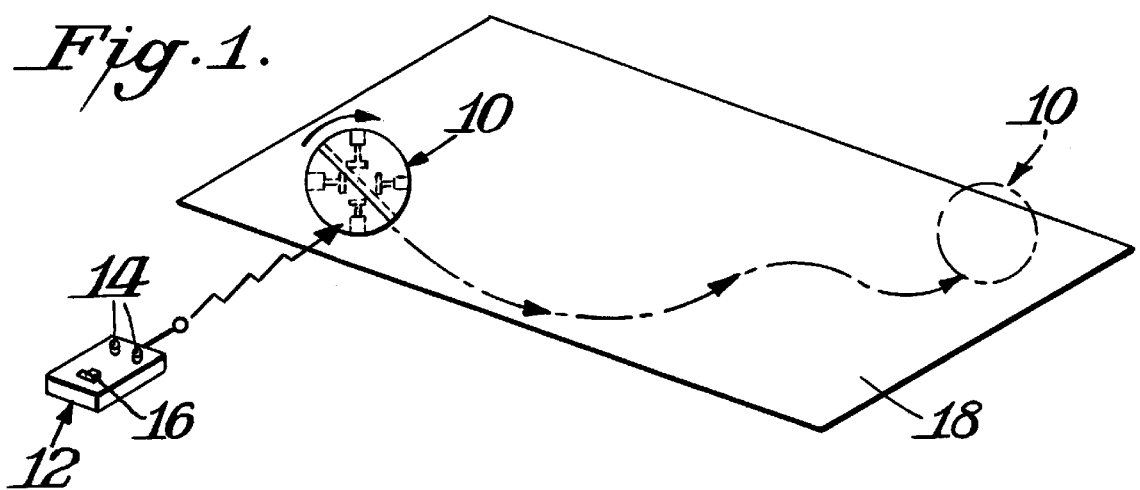
FIG. 1 is a schematic diagram showing the autonomous rolling robot of this invention during use.

In accordance with this invention an autonomous rolling robot is provided which is in spherical form and which may be controlled in its movement for various applications including, but not limited to, mine clearance, surveillance and toys. The robot could be controlled from a remote location through a transmitter so as to control the movement of the robot. FIG. 1, for example, illustrates an autonomous rolling robot 10 in accordance with this invention. As shown therein robot 10 is of spherical shape having a smooth outer surface so as to facilitate its rolling movement. The movement of the robot is controlled by a remote transmitter 12 having a suitable number of actuators 14. If desired, transmitter 12 may also be provided with an on/off switch 16. Thus, when robot 10 is placed on a surface 18 the robot is cause to move in a controlled manner by actuating transmitter 12. FIG. 1 shows in phantom a pattern of movement of robot 10 from the position illustrated in solid lines at the left-hand portion of surface 18 to the position shown in phantom at the right-hand portion of surface 18.

Figure 2:
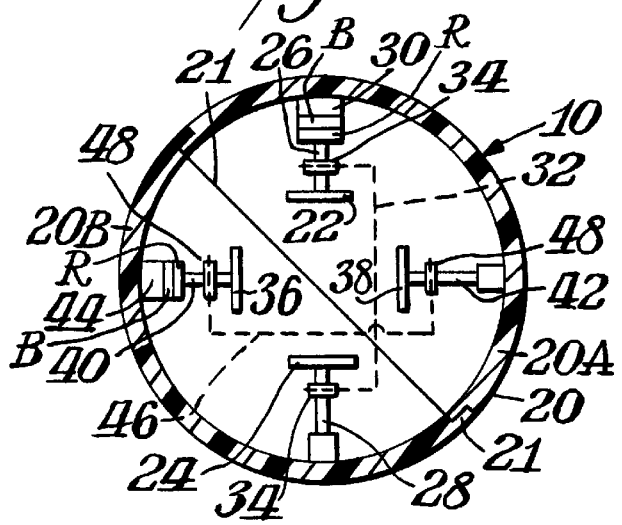
FIG. 2 is a cross-sectional view of an autonomous rolling robot in accordance with this invention.

FIG. 2 illustrates a preferred practice of this invention. As shown therein, two sets of rotors are mounted within the hollow spherical shell 20 which forms robot 10.

One set of rotors 22,24 is mounted on shafts 26,28. The shafts 26,28 are radially mounted in line with each other and if extended would intersect the center point of the sphere 20. One of the shafts, such as shaft 26, is provided with a motor 30. The shafts are connected to each other by any suitable transmission mechanism 32, such as belts or gears, mounted in any suitable manner on transmitting members (gears, pulleys, etc.) 34. When one of the actuators 14 is actuated such as by pressing a button or rotating a dial, the motor 30 is in turn actuated which causes the simultaneous movement of shafts 26,28 and their rotors 22,24.

The robot also includes a second set of rotors 36,38 mounted on shafts 40,42 which are diametrically in line with each other and extend radially toward the center point of the hollow sphere 20. One of the shafts, such as shaft 40, is provided with a motor 44 and a suitable transmission mechanism 46 interconnects both shafts, such as shown by the dashed line extending from transmission members 48,48. When the other actuating member 14 of control transmitter 12 is actuated shafts 40,42 and their rotors 36,38 are caused to rotate.

Thus, the robot 10 shown in FIG. 2 consists of a spherical shell containing two independent sets of rotors mounted on the inner surface at mutually perpendicular axes intersecting the center of the sphere. The outer surface of the sphere is smooth to facilitate its rolling movement. The robot 10 would be placed on a surface which is preferably flat and the robots are actuated remotely from a radio link from transmitter 12. The motion of the rotors induces the robot 10 to roll and spin on the surface 18.

The robot 10 incorporates two main features which differ from the existing designs for mobile robots: (1) the spherical geometry allows omnidirectional movement, exceptional movability and stability and (2) the use of the perpendicularly mounted rotors for actuation of the robot 10 is a major difference from earlier spherical robot designs.

The primary advantages of the autonomous rolling robot as compared to other designs for mobile robots includes (1) in comparison to legged or wheeled robots, robot 10 is able to change direction more quickly and within less space and does not suffer from becoming inoperational by being "flipped over" and (2) the robot contains fewer moving parts than most existing designs.

Preferably the shell 20 is formed in two halves 20A, 20B which are joined together at the connecting line 21 so that each hemispherical half shell would contain components which are identical with the components of the other half shell 20A and 20B.

As illustrated in FIG. 2, four flat rotors 22,24 36,38 are each mounted on its own shaft with each shaft in turn being secured to the inner surface of the sphere 20. Each shaft has an associated motor 30,44 so that the shaft and its rotor are capable of rotation upon actuation of the motor. The shafts are aligned in two sets. Shafts 26,28 comprise one set and shafts 40,42 are the other set with each set being perpendicular to each other and being directed to extend through the center point of the sphere. The radio signal transmitter 12 sends pulse data which sequentially operates each set of rollers for the two sets of shafts and rotors. By controlling the pulse data it is possible to control the rotation of one set of rotors with respect to the other set of rotors and thus control the speed and direction of the sphere 20.

It is to be understood that the invention may be practiced with variations other than what is illustrated in FIG. 2. For example, instead of having a rotor in the form of a flat, thin circular disk the rotor may be in the form of a wheel which could be thicker than the disk and which could be of skeletal form. What is important is achieving symmetry and balance of the sets of robots.

Figure 3:
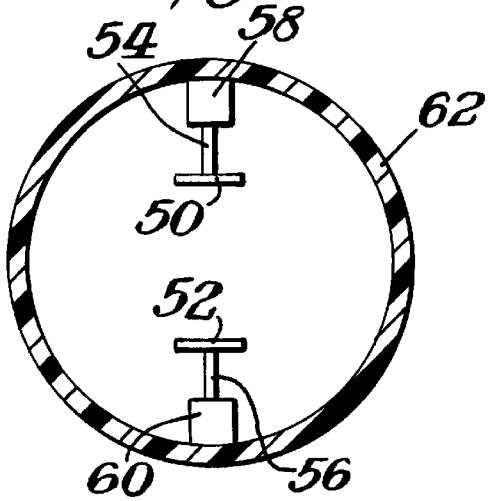
FIGS. 3–5 are views similar to FIG. 2 of alternative forms of robots in accordance with this invention.

FIG. 3 illustrates a further variation of the invention. As shown therein the robot includes only two rotors 50,52 each mounted on its own shaft 54,56 and each driven by its own motor 58,60. The shafts are radially located diametrically opposite to each other in a direction which would extend through the center point of the sphere 62. The motors 58,60 would be individually controlled by the two actuators 14 on the remote transmitter, such as transmitter 12.

Figure 4:
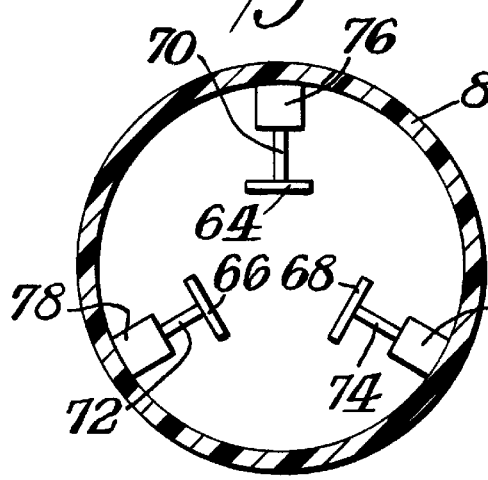

FIG. 4 shows a further alternative of this invention wherein three rotors 64, 66, 68 are each mounted on its own shaft 70, 72, 74 driven by its own motor 76, 78, 80 on the inside of a sphere 82. The rotors are equally spaced within the hollow sphere 82. Shafts 70, 72, 74 extend in a radial direction and an imaginary extension of the shafts would result in all shafts intersecting at the center point of the sphere. As with the embodiments of FIGS. 2–3 the rotors 64,66 and 68 rotate about an axis which would extend through the center point of the sphere.

Figure 5:
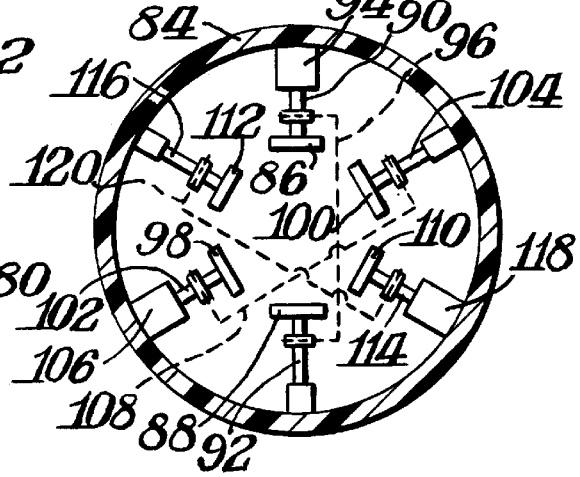

FIG. 5 shows yet another variation of the invention wherein the sphere 84 is provided with three sets of rotors having two rotors in each set. This would be similar to the arrangement of FIG. 2 except that a third set of rotors is provided. The resulting additional set causes the mounting location to be displaced so that all of the shafts would rotate about an axis wherein the axes would all intersect at the center point of the sphere 84. In the embodiment of FIG. 5 one set of rotors 86,88 would be mounted on shafts 90,92 aligned with each other and driven by a single motor 94 with the shafts being interconnected by a suitable transmission mechanism 96. A second set of rotors 98,100 would be mounted on shafts 102,104 driven by a single motor 106 with the shafts being interconnected by a transmission mechanism 108. The third set of rotors 110,112 would be mounted on aligned shafts 114,116 driven by a single motor 118 with the shafts being connected by transmission mechanism 120.

In one example of the invention the spherical rolling robot 10 is a spherical aluminum shell and is assembled in two halves 20A, 20B. Each hemispherical half-shell 20A, 20B contains a receiver, a motor assembly, rotors and batteries for the rotor axes. FIG. 2 illustrates each motor 30,44 to have an associated receiver R and batteries B whereby the shell halves 20A and 2B thereby contain identical components.

The motor casing and holder for the batteries would be attached to the shell by any suitable fasteners such as screws which are countersunk so as to keep the outside of the spherical shell free from irregularities. If desired, the outer surface of the robot could be provided with six cross-like markings made in a tetrahedral pattern. The markings could be used by a camera to locate the robot from a top view in order to monitor the robot movement.

An important property of the robot 10 is that its center of mass lies exactly at the geometric center of the spherical ball. In the preferred practice of the invention the ball is so assembled that every component has a corresponding identical component placed diametrically opposite on the sphere. The result of this property is that the center of mass of the robot always lies above its contact point. Thus, the ball does not tend to flip over. For example, if one set of robots is provided with only one motor for one shaft an equal mass component might be provided on the opposite shaft of that set so as to result in identical mass components.

In the preferred practice of the invention each rotor is fixed to its shaft for joint rotation of the rotor and shaft. If desired, the invention could also be practiced where the shaft does not move and where the rotor moves on the shaft. This would require having a drive connection between the drive mechanism such as the motor and the rotor. The illustrated embodiments, however, are preferred for simplicity of operation.

In a practice of the invention the signals are sent to the robot 10 using a transmitter 12 which may be a Futaba™ 2-channel AM transmitter. The two channels of the transmitter are controlled using voltage outputs from a NuDAQ™ 2-channel D/A analog output card installed in a 90 MHZ Pentium computer.

As discussed above, FIGS. 2–5 illustrate variations of the invention wherein as little as two individual rotors are used (FIG. 3) and as much as six rotors arranged in three sets (FIG. 5) are used. While theoretically it is possible to use even more rotors than those illustrated, such additional rotors would be impractical. What the various embodiments have in common is that the rotors are arranged with their associated mechanisms so as to lie along radial axes which would intersect at the center point of the sphere. Each rotor would rotate about its radial axis. The spacing of the rotors is such as to provide a balance of the components within the hollow sphere. The center of mass would lie exactly at the geometric center of the sphere. As a result, the autonomous rolling robot could be accurately controlled in its movement by a remote transmitter. Thus, the robot could function for various uses such as mine clearance and surveillance, as well as being an amusement device or toy.

What is claimed is:

1. An autonomous rolling robot comprising a hollow sphere having a smooth outer surface and an inner surface and a geometric center, at least one set of a pair of rotors mounted within said sphere to said inner surface, each rotor of each pair having an axis located diametrically opposite the other rotor of its pair, each of said rotors being located at a position other than said geometric center of said sphere, each of said rotors being mounted on a shaft which extends radially toward said geometric center of said sphere with all of said shafts being in a direction which would intersect at said geometric center, and said at least one set of rotors being mounted within said sphere in a balanced manner equally spaced apart from each other.

2. The robot of claim 1 wherein each of said rotors rotates around its radial axis.

3. The robot of claim 2 wherein each set of rotors is provided with a motor, and said shafts of each set being connected by a transmission mechanism whereby each motor simultaneously rotates both shafts of each set.

4. The robot of claim 3 wherein there is a total of two sets of said rotors.

5. The robot of claim 3 wherein there is a total of three sets of said rotors.

6. The robot of claim 3 wherein there is a total of one set of said rotors.

7. The robot of claim 1 wherein each of said rotors is a flat circular disk.

8. The robot of claim 1 wherein the center of mass of said robot lies exactly at said geometric center of said sphere.

9. The robot of claim 8 including a remote transmitter having an actuator for each of said sets of rotors for sending signals to said drive mechanism for each of said sets of rotors.

10. The robot of claim 1 wherein said sphere is formed by two hemispherical half shells, each of said half shells containing a receiver and a motor assembly and a rotor whereby each half shell contains components which have identical components as the other half shell.

11. The robot of claim 1 wherein there are at least two sets of said rotors.

12. An autonomous rolling robot comprising a hollow sphere having a smooth outer surface and an inner surface and a geometric center, an odd number of plural rotors mounted within said sphere to said inner surface, each of said rotors being located at a position other than said geometric center of said sphere, each of said rotors being mounted on a shaft which extends radially toward said geometric center of said sphere with all of said shafts being in a direction which would intersect at said geometric center, and said rotors being mounted within said sphere in a balanced manner equally spaced apart from each other.

13. The robot of claim 12 wherein there are a total of three of said rotors.

14. The robot of claim 12 wherein each of said rotors rotates around its radial axis.

15. The robot of claim 12 wherein each of said rotors is a flat circular disk.

16. The robot of claim 12 wherein the center of mass of said robot lies exactly at said geometric center of said sphere.

17. The robot of claim 12 including a remote transmitter having an actuator for each of said rotors for sending signals to said drive mechanism for each of said rotors.

* * * * *